Nov. 12, 1968   A. M. KURITZKES ET AL   3,410,934
METHOD FOR THE PRODUCTION OF PIGMENTED CAST PLASTIC SHEETS
Filed Oct. 11, 1965

INVENTORS
ALEXANDER M. KURITZKES
DONALD R. TREADWELL
CHARLES A. QUINN

OSTROLENK, FABER, GERB & SOFFEN
ATTORNEYS 3,410,934
METHOD FOR THE PRODUCTION OF PIGMENTED
CAST PLASTIC SHEETS
Alexander M. Kuritzkes, Croton-on-Hudson, Donald R. Treadwell, Buchanan, and Charles A. Quinn, Yorktown Heights, N.Y., assignors to The Mearl Corporation, Ossining, N.Y., a corporation of New York
Filed Oct. 11, 1965, Ser. No. 494,616
7 Claims. (Cl. 264—74)

ABSTRACT OF THE DISCLOSURE

A method for producing a pigmented cast polyester resin sheet providing a play of color varying with the angle of incident light in which multiple polyester resin layers are rotationally cast so as to form an irregular interface between adjacent layers and nacreous and color effects are provided by the incorporation of plate-like pigment particles in the polyester resin layers.

---

Figure 1:
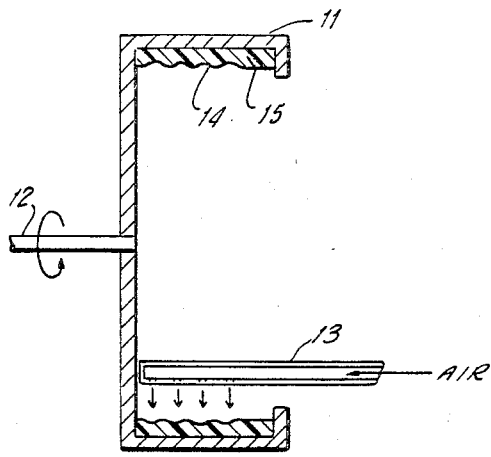

This invention relates to a method for the production of pigmented cast plastic sheets or other articles containing light-reflecting, plate-like pigment particles which may impart nacreous lusters thereto or, by optical interference phenomena, produce color therein. More particularly, the invention relates to such a method for forming pleasing pigment patterns in such cast plastic articles which patterns, in the case of products produced employing iridescent pigments, provide color-play reminiscent of natural shell.

Nacreous pigments are substances which produce a nacreous or pearl-like effect when incorporated in transparent or translucent substances like plastic, or when applied to surfaces in the form of paint or lacquer coatings. The pearl-like effect is achieved by orienting crystalline or non-crystalline platelets of such pigments in parallel layers, light incident thereon being simultaneously reflected in a given direction from a multitude of surfaces and thereby producing the type of luster which is characterized as pearly.

Various of the nacreous pigments possess a further optical property, i.e., are iridescent or produce color by optical interference phenomena. Such iridescence is provided when the thickness of the pigment platelet is such that interference effects are obtained between reflections from the two parallel faces thereof. Such pigments, when illuminated by white light, reflect various colors and transmit the colors complementary thereto.

A wide variety of nacreous and/or iridescent pigments are known in the art such, for example, as those referred to in U.S. Patents 2,713,004, 2,863,783, 2,875,074, 2,875,076, 2,922,724, 2,945,770, 2,950,981, 2,974,053, 2,989,411, 3,071,482, 3,082,179, 3,123,485, 3,123,489, and 3,123,490, which patents are owned by the assignee of the present invention. The preparation of other nacreous and/or iridescent pigments is described in various copending applications, including applications Ser. No. 261,479, filed on February 27, 1963, now abandoned, and Ser. No. 424,832, filed on January 11, 1965, each of which applications is also owned by the assignee of the present invention. Apart from natural guanine obtained from fish, the synthetic material most widely used (as of the present date) for naceous and iridescent pigments consists of platelets of basic lead carbonate suspended in an appropriate vehicle; iridescent pigments constituted of such material are described, for example, in U.S. Patent No. 3,123,485, referred to above.

For convenience the following description relates principally to the production of pigmented cast plastic articles incorporating iridescent basic lead carbonate pigments. Employing iridescent pigments it is possible, as noted above, to provide cast articles simulating natural shell. It will, however, be understood that the method of the present invention is not intended to be limited to the use of iridescent pigments, much less to the most commonly employed basic lead carbonate iridescent pigment. Rather, it is intended that any of the numerous nacreous and/or iridescent pigments (including those referred to in the above patents and patent applications, the disclosures of which are incorporated herein by reference) may be utilized in the practice of the method of the present invention.

Commercially available iridescent basic lead carbonate pigments consist of hexagonal platelets, generally between about 10 and 30 microns in diameter. Such platelets are substantially uniform in thickness, desirably having thicknesses such that at least about 70 to 80% of the total crystal plate area does not differ in thickness by more than ±10% of the average crystal thickness. Thicknesses with this minimum degree of uniformity insure colors of sufficient intensity for practical use.

Platelet thicknesses are most conveniently measured as optical thickness $Nd$, the product of the platelet refractive index ($N$) and the geometrical thickness ($d$) thereof. Optical thicknesses smaller than 190 millimicrons ($m\mu$) yield faint color, if there is any color at all. Platelets of such small optical thickness are nacreous, i.e., produce a pearl luster which is on the whole white, the whiteness being slightly shaded either toward blue or toward yellow. Optical thicknesses above 190 $m\mu$ produce colors in accordance with the following table:

TABLE I.—REFLECTION COLORS OF IRIDESCENT PIGMENTS OF VARIOUS OPTICAL THICKNESSES

| Reflection color at perpendicular incidence: | Approx. Optical thickness ($m\mu$) |
|---|---|
| 1st— | |
| Yellow | 190 |
| Red | 255 |
| Purple | 280 |
| Blue | 310 |
| Green | 340 |
| 2nd— | |
| Yellow | 405 |
| Red | 500 |
| Purple | 560 |
| Blue | 625 |
| Green | 700 |
| 3rd— | |
| Yellow | 740 |
| Red | 780 |
| Blue | 900 |
| 4th— | |
| Purple | 1100 |
| Green | 1220 |
| 5th— | |
| Yellow | 1280 |
| Red | 1340 |
| Green | 1480 |

The terminology first (1st) yellow, first (1st) red, second (2nd) yellow, second (2nd) red, etc. is used herein to characterize the first, second, and succeeding occurrences with increasing thickness of each of the reflection colors, in preference to the terms "first order yellow," "second order yellow," etc. The usual definition of first and higher order interference colors by order number is not always consistent with the value of "$n$" in the familiar equations for light interference phenomena, "$n$" also occasionally being referred to as order. Hence, the nomenclature given above has been here used instead.

The colors which such pigment platelets exhibit, because of optical interference, depend on the phase relationship between the reflection from the front surface of each platelet (or thin film) and the back surface of the platelet. The phase relationship, in turn, depends on the difference in path length between the two rays reflected from the first and second surfaces. This difference, finally, is a function of the angle of incidence, the difference in path length being greater for light perpendicularly incident on the platelet than for light incident at some other angle.

As a consequence, the reflection and transmission colors change with angle of observation. Platelets of optical thickness of 350 m$\mu$ reflect green light when seen perpendicularly. If the positions of the platelets, light source, and eye are then shifted so that the angle of incidence, viz, the angle between the incident ray and the normal to the surface, is not 0°, but is instead 45°, the platelet appears blue. An increase in angle of incidence thus produces a color which corresponds to a decrease in optical thickness.

The shift of color with angle of observation is, in general, much more marked in second and higher colors, i.e., those pigments having optical thicknesses in excess of about 350 m$\mu$, than in the first colors. Hence, platelets having optical thicknesses of about 700 m$\mu$ (second green) display color shifts from green to purple with increasing angle of incidence. Very striking color-plays are shown, for example, by second red colored iridescent pigments, which reflect red at an angle of incidence of 0° while reflecting green at fairly high angles of incidence.

The color shifts thus obtained may be varied by changing the positions of the source of the reflected light and the eyes of the beholder of the iridescent pigment. Alternatively, increased color-play may also be obtained by associating the iridescent pigment particles with an optically refracting element through which the pigment platelets are visible, such as described in Greenstein application Serial No. 431,002 (N-52), filed February 8, 1965, and owned by the assignee of the present invention.

Color shifts may also be obtained, employing fixed positions for the light source and eyes, if the plane of orientation of the iridescent pigment platelets is changed. The method of the present invention imparts such an orientation to iridescent pigment platelets, thereby forming articles which, though they incorporate pigments of substantially uniform optical thicknesses, reflect a multiplicity of colors in a color-play reminiscent of natural shell.

It is thus among the objects of the present invention to provide a method for forming iridescent cast plastic articles displaying the aforesaid color-play.

A further object of the invention is to provide such a method which may be utilized to produce nacreous cast plastic articles having esthetically pleasing patterns formed therein.

These and other objects and advantages of the present invention will be apparent when considered in connection with the following discussion.

It is convenient to prepare cast plastic sheets from polymerizable resins by a technique known as rotational or centrifugal casting. Rotational casting procedures for the formation of cast plastics incorporating pigment platelets are described, for example, in Clewell et al. Patent No. 2,265,226 of December 9, 1941, and Gerson et al. Patent Nos. 2,856,635 of October 21, 1958 and 3,202,741 of August 24, 1965, and copending Bolomey application Serial No. 196,497 (N-38), filed May 21, 1962, now abandoned, which application is owned by the assignee of the present invention.

In the practice of such methods polymerizable resinous materials, e.g., polyester resins, are cast in admixture with the desired pigment within a rotating drum. The resulting cast resin is spread evenly over the wall of the drum during rotation and gelled to form a flexible cylinder, which is sliced, removed from the drum, and placed on a flat surface (to cure). The plastic sheets thus formed serve as a common source for pearl button blanks, which may be made by cutting discs from such sheets prior to complete curing thereof.

Employing conventional rotational casting techniques, the pigment platelets are uniformly oriented, parallel to the surface of the cast sheet. When second or higher color iridescent pigments are thus cast, the final product appears, however, to have a uniform reflection color, which depends on the angle of observation.

It has also been proposed (in Gerson et al. Patent No. 3,202,741) to provide an irregular orientation of the pigment constituents of a cast plastic sheet, by rotationally casting the same within a casting machine the inner cylindrical surface of which is provided with an overall relief pattern designed to form an irregular outer surface on the cast sheet. After such a sheet is formed and articles, e.g., button blanks, punched therefrom, the irregular article surfaces are ground and polished to remove the protuberances deliberately formed during casting. Such procedure is of course objectionable due to the necessity to modify the conventional casting machine, and to provide the additional grinding or polishing operation involved therein.

It has now been discovered, in accordance with the present invention, that pigmented cast plastic sheets may be prepared (without the modification of conventional rotational casting equipment or the provision of additional casting operations) which, unlike those produced employing conventional rotational casting procedures, exhibit non-uniform reflection colors and provide color-plays which are not dependent upon the angle of observation thereof. Such results are effected in accordance herewith by initially rotationally casting a first layer of a polymerizable resinous material, the outer surface of which defines a straight line in transverse cross-section, and forming an irregular inner surface on such layer during gelation, the inner surface defining, in transverse cross-section, a wavy line delineating a plurality of crests and troughs. A substantially homogeneous dispersion of light reflecting, plate-like pigment particles in a polymerizable resinous material is thereafter rotationally cast within the first layer thus formed to produce at least one additional pigment-containing layer in juxtaposition with the irregular inner surface of the first layer. By orienting the pigment platelet thus cast in conformity with the irregular surface of the first cast layer, pleasing patterns and, in the case of iridescent pigments, continuous color-plays, are imparted to the cast plastic sheet or other article produced therefrom.

A convenient method for forming irregular surfaces upon the plastic layer prior to complete gelation thereof involves exposing such layer to a plurality of jets of air or other gas to form the desired ripple-like pattern. Alternatively, such pattern may be formed by purely mechanical means, as by contacting the plastic surface with a plurality of mechanical fingers, e.g., projecting rods, which impart the desired irregularity thereto. It is, however, preferred to employ jet pressure to form the irregular surface configuration, in view of its extreme simplicity.

In a preferred embodiment of the invention a thin layer of clear, unpigmented resin is provided as the first or outer layer of the cast sheet (that layer adjacent the side of the sheet adjacent the observer), and a further layer of resin containing iridescent pigment of second or higher color is cast as the second or inner layer. When such a sheet is examined from any specific point of view, different colors are seen in the wave pattern. The color variation is greatest when light comes from many directions, as outdoors, or in a room with a number of lights. A second red iridescent pigment, for example, displays red in the crests and troughs of each wave, while yellow and green are seen in other portions of the wave pattern.

It is not, however, necessary to employ a pigment-free resinous medium for the outer layer of the composite sheet, adjacent the viewing side thereof, since intense color-play may also be seen when both the inner and outer layers of the sheet contain iridescent pigment particles. Nevertheless, when such particles are incorporated in a plurality of layers of the cast article it is desirable that the layer adjacent the viewing side of the article have a lesser opacity than the layer (or layers) of the article more remote from such side.

As described above, striking color-plays can be obtained employing only one iridescent pigment in a two-layer cast article. Even more striking effects can, however, be obtained by casting sheets with more than two layers, having two or more irregular interfacial surfaces, and/or by using different iridescent pigments in the several layers. It is important, in these more complex embodiments of the invention, to use pigmented resins of relatively low opacity, so that the inner layers, more remote from the viewing side of the article, may be seen through the outer ones.

Figure 2:
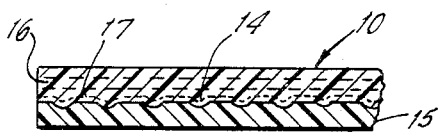

The nature of the invention can best be clarified from a consideration of the following example of a preferred embodiment thereof, taken in consideration with the accompanying drawing, in which:

FIGURE 1 is a vertical diagrammatic section through a rotating cylindrical drum for casting iridescent plastic articles in accordance with the invention; and FIGURE 2 is an enlarged cross-section through a cast plastic sheet prepared by the practice of the invention.

In one laboratory experiment an iridescent cast plastic sheet 10 was produced by rotational casting within a rotating cylindrical drum 11 mounted with its axis 12 in the horizontal plane. The drum had a diameter of 24 cm. and a depth of 12 cm.

200 grams of a clear, catalyzed resinous polyester casting composition (having a gel time of 10 minutes at 25° C.) was poured into the drum, which was rotated at 75 r.p.m.

The casting composition had the following composition in parts by weight:

| | Parts |
|---|---|
| Styrenated polyester resin (composed of phthalic and maleic acids, and ethylene and propylene glycols) | 100 |
| Cobalt naphthenate (6% Co) | 0.07 |
| Methyl ethyl ketone peroxide (60%) | 0.8 |

Six pairs of gas jets were projected on the resin surface during gelation thereof. The jets were provided by drilling 12 spaced holes (0.04 inch diameter each) in a closed pipe 13, and introducing dry nitrogen gas in accordance with the following pressure schedule: The gas was initially fed at 1 lb./in.$^2$, and the pressure was then gradually increased until deep grooves were formed in the resinous layer, without splashing or running into each other (to a pressure of about 12 lbs./in.$^2$). When gelling began, the gas pressure was increased (within about 1 minute) to 25 lbs./in.$^2$, at a rate at which splattering was prevented. The gas pressure was thus maintained as high as possible, without the troughs formed coalescing. Deep grooves were thus formed in the plastic surface, defining a wave-like surface 14.

The high gas pressure was maintained until the clear cast was well hardened, about 10 minutes after gelation, forming inner layer 15 (see FIGURE 2).

300 grams of a polyester resin composition containing an iridescent pigment were then poured on top of the ridged, clear layer after the latter had gelled without, however, the use of the gas jets. The resin composition was identical to that described above, with the addition of 2.5 parts by weight of an iridescent pigment having a second red reflection color at perpendicular incidence (Murano Color PRFR supplied by the Mearl Corporation, and containing 35% basic lead carbonate crystal platelets having a refractive index of 2.09). After 10 minutes the second layer had gelled into layer 16, with at least a portion of the iridescent pigment platelets 17 being cast in the configuration of the wave-like surface 14.

The composite cast was left in the centrifuge for an additional 30 minutes, after which it was sliced twice in a direction parallel to the axis and the two halves were placed on a flat surface. A cross-section of the cast thus formed is illustrated in FIGURE 2.

When the cast sheet thus formed was viewed along a line perpendicular thereto, the color red was reflected in the crests and troughs of the wave pattern. When the cast was illuminated by light from many directions, e.g., outdoors or in a room with several light sources, yellow and green were simultaneously seen in other portions of the wave pattern. If the iridescent pigment were second green instead of second red, green would be seen in the crests and troughs while other portions of the pattern would display blue and purple.

Cast sheets prepared as thus described may be permitted to cure at room temperatures to produce iridescent panelling, or may be cut into discs for button blanks while still soft, the button blanks then being rapidly cured at elevated temperature.

It may be readily seen that many variations are possible within the spirit of the invention. For example, when gas jets are employed to form the irregular non-planar interfacial surfaces, such need not be held stationary, but can be slowly moved in and out and side to side to give a less uniform pattern. In and out movement of the gas jets in relation to the rate of rotation of the drum can also be utilized to form a criss-cross pattern. Combinations of such patterns can be used to give a natural shell-like appearance to the cast. Similarly, a first pattern can be used for a first irregular surface, and other patterns formed at other surfaces of multilayer casts. Moreover, and as indicated above, either nacreous or iridescent pigments may be utilized in the practice of the method hereof to impart esthetically pleasing pigment patterns and, in the case of iridescent pigments, interesting color-plays, to the cast plastic sheets or other articles produced in accordance herewith.

Accordingly, it will be understood that various changes may be made in the preferred procedures and products described hereinabove without departing from the scope of the present invention. The preceding specification should, therefore, be construed as illustrative and not in a limiting sense.

We claim:
1. A method for the production of a pigmented cast polyester resin sheet, which comprises:
   (a) rotationally casting a first layer of a polyester resin, the outer surface of which defines a straight line in transverse cross section;
   (b) forming an irregular inner surface on said first layer during gelation of the polyester resin, said inner surface defining, in transverse cross-section, a wavy line delineating a plurality of crests and troughs, and
   (c) rotationally casting at least one additional layer of a substantially homogeneous dispersion of light-reflecting, plate-like pigment particles in a polyester resin in juxtaposition with the irregular inner surface of said first layer; said plate-like pigment particles being light-transmitting, iridescent platelets having substantially uniform thicknesses of magnitudes such that colors are produced by optical interference phenomena upon reflection and transmission of light by said platelets.

2. The method of claim 1, including rotationally casting at least three layers of polyester resin, producing at least two irregular interfacial surfaces on said layers, and providing said light-reflecting, plate-like pigment particles in at least the layer remote from the viewing side of said sheet, the particles in said remote layer having greater opacity than the particles, if any, in the layers of said sheet more proximate to the viewing side thereof.

3. The method of claim 1, including providing said irregular inner surface on said first layer by exposing said layer, prior to complete gelation thereof, to a plurality of gas jets to form ripples in said surface.

4. The method of claim 1, including providing said irregular inner surface on said first layer by contacting said surface, prior to complete gelation thereof, with a plurality of mechanical fingers to form ripples in said surface.

5. The method of claim 1, in which said first layer contains light-reflecting, plate-like pigment particles of lesser opacity than the pigment particles in said additional layer.

6. The method of claim 1, in which the light-reflecting iridescent pigment particles comprise hexagonal platelets of basic lead carbonate having diameters of from 10 to 30 microns and substantially uniform thicknesses such that the optical thickness $Nd$ thereof is from 190 to 1500 millimicrons, said platelets producing both nacre and colors by optical interference phenomena upon reflection and transmission of light thereby.

7. The method of claim 6, in which said platelets have thicknesses such as the optical thickness $Nd$ thereof is from 350 to 1500 millimicrons, the platelets thereby imparting second and higher colors to the cast plastic sheet.

References Cited

UNITED STATES PATENTS

| | | | |
|---|---|---|---|
| 3,328,499 | 6/1967 | Barnette | 264—108 |
| 3,231,645 | 1/1966 | Bolomey | 264—73 |
| 3,219,734 | 11/1965 | Mattin | 264—73 |
| 3,202,741 | 8/1965 | Gerson | 264—108 |

JAMES A. SEIDLECK, *Primary Examiner.*

T. MORRIS, *Assistant Examiner.*